United States Patent [19]

Barboux et al.

[11] Patent Number: 4,962,082
[45] Date of Patent: Oct. 9, 1990

[54] METHOD OF MAKING HIGH TC OXIDE SUPERCONDUCTOR PARTICLES BY ADJUSTING PH VALUE AND CATIONIC RATIO OF ADMIXED SOLUTION FOLLOWED BY DRYING, HEATING AND FIRMING

[75] Inventors: Philippe Barboux, Eatontown; Jean-Marie Tarascon, Millington, both of N.J.

[73] Assignee: Bell Communications Research, Inc., Livingston, N.J.

[21] Appl. No.: 122,460

[22] Filed: Nov. 19, 1987

[51] Int. Cl.$^5$ .................. C01F 11/04; C01F 17/00
[52] U.S. Cl. .................. 505/001; 252/518; 252/527; 420/901; 423/263; 423/593; 505/735
[58] Field of Search ............ 505/1, 735; 252/518, 252/521; 423/263, 593; 501/152

[56] References Cited

U.S. PATENT DOCUMENTS

| | | | |
|---|---|---|---|
| 4,049,789 | 9/1977 | Manabe | 423/593 |
| 4,567,031 | 1/1986 | Riley | 423/593 |
| 4,588,575 | 5/1986 | David | 423/593 |
| 4,627,966 | 12/1986 | Micheli | 423/263 |
| 4,636,378 | 1/1987 | Pastor et al. | 423/598 |
| 4,643,984 | 2/1987 | Abe et al. | 423/598 |
| 4,661,282 | 4/1987 | Clark | 423/593 |
| 4,676,928 | 6/1987 | Leach et al. | 423/630 |
| 4,764,357 | 8/1988 | Sherif et al. | 423/338 |
| 4,804,649 | 2/1989 | Sherif | 505/1 |
| 4,866,031 | 9/1989 | Bolt et al. | 505/001 |

OTHER PUBLICATIONS

D. L. Segal, Journal of Non-Crystalline Solids, vol. 63, p. 183 (1984).
S. Doeuff et al., Journal of Non-Crystalline Solids, vol. 89, p. 84, (1987).
Chu et al., J. Am. Ceram. Soc. 70 (Dec. 1987) C-375, Iqbal et al., Reprint Oct. 29, 1987, pp. 1-5.
Tarascon et al., in Chemistry of High-Temperature Superconductors, ed. Nelson et al., ACS-Symp. #351, Aug. 30-Sept. 4, 1987, p. 199.
Fujiki et al., Jap. Jour. Appl. Phys. 26 (Jul. 1987), p. L1159-1160.

Primary Examiner—Upendra Roy
Attorney, Agent, or Firm—James W. Falk; Edward M. Fink

[57] ABSTRACT

Techniques for the preparation of superconducting perovskites in the $MBa_2Cu_3O_{7-y}$ system wherein M represents yttrium of a rare earth element and y is an integer ranging from 0.1 to 0.8 are described. The techniques involve the use of either a sol-gel or controlled precipitation process in which a barium solution in acetic acid is reacted with copper acetate and either a rare earth hydroxide or rare earth nitrate to form a colloid which is subsequently heated and fired to yield the desired composition. In the embodiment in which the nitrate is employed, the resultant colloid is freeze dried. In both the sol-gel and controlled precipitation processes, heating and firing are required to yield the desired characteristics.

5 Claims, 1 Drawing Sheet

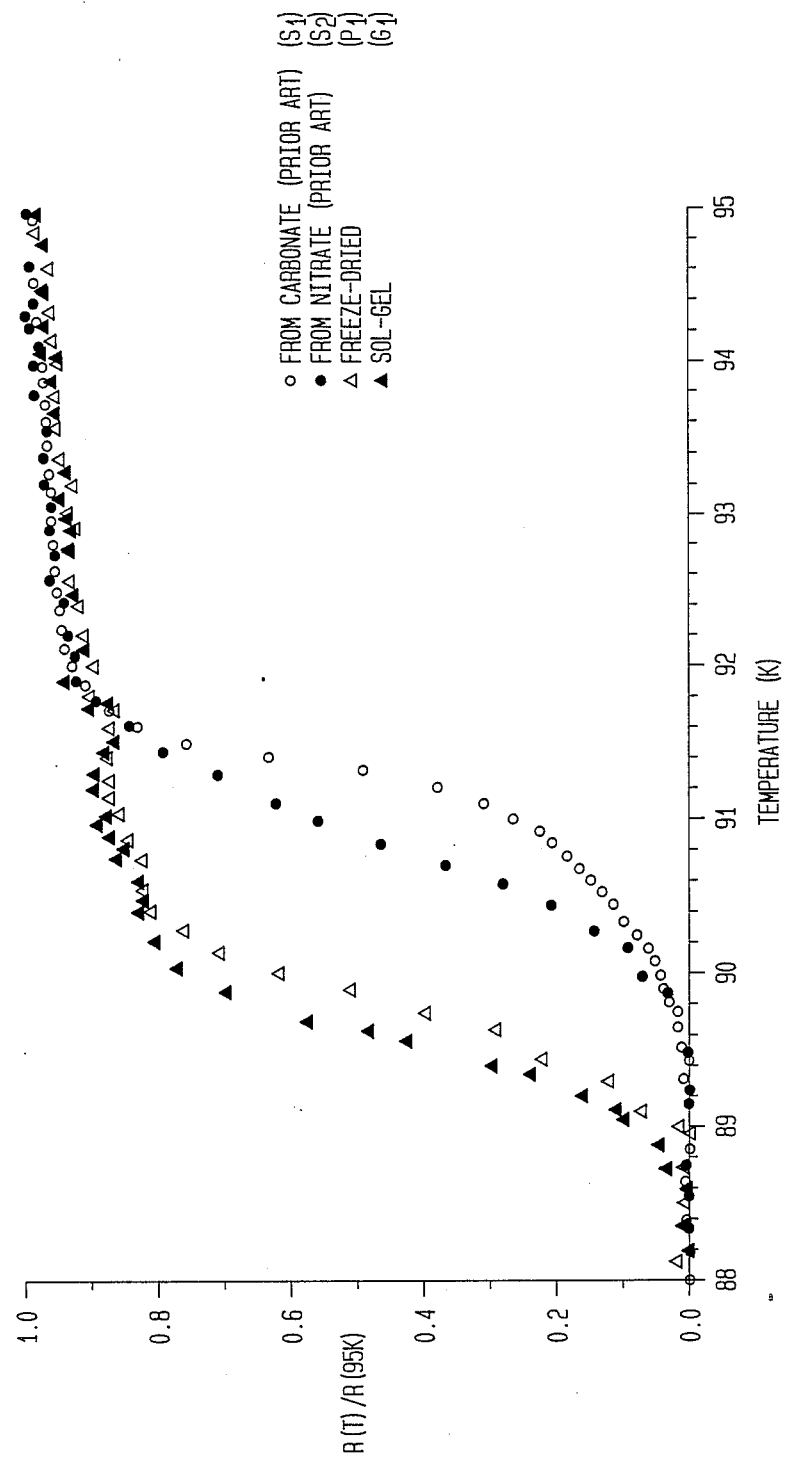

METHOD OF MAKING HIGH TC OXIDE SUPERCONDUCTOR PARTICLES BY ADJUSTING PH VALUE AND CATIONIC RATIO OF ADMIXED SOLUTION FOLLOWED BY DRYING, HEATING AND FIRMING

BACKGROUND OF THE INVENTION

This invention relates to a method for the preparation of superconducting compositions. More particularly, the present invention relates to a method for the preparation of high temperature superconducting oxides using solution chemistry.

Since the recent discovery of superconductivity in the La-Ba-Cu-O system, several new crystalline oxide phases of the general formula $MBa_2Cu_3O_7\text{-}y$ wherein M represents yttrium and the rare earth elements and y is an integer ranging from 0.1 to 0.8 have been discovered. These compositions evidence superconducting transition temperatures, $T_c$, as high as 95K and extrapolated critical fields of the order of 300 Teslas at 4.2°K. Accordingly, these discoveries have generated significant technological interest and have sparked intense studies of processing techniques for preparing these materials in bulk or thin film form. Heretofore, superconducting thin films have been prepared by molecular beam epitaxy, evaporation, sputtering and pulsed laser evaporation, the properties of the resultant compositions being similar to that of the bulk material.

The new high Tc oxides are typically obtained by conventional ceramic techniques which involve mixing oxides with the appropriate carbonates, oxalates or nitrates and firing the resultant mixture. This reaction proceeds by diffusion in the solid state and hence requires temperatures ranging up to 950° C. with reaction times of at least 48 hours in order to obtain well crystallized materials. Unfortunately, a major difficulty encountered in preparing the 95K superconducting compositions by this method is the imperfect homogeneity of the resultant composition, so necessitating regrinding, repressing and/or refiring to yield the homogeneity required for device applications. It is this heterogeneity of the ceramic materials and uneconomical processing which contribute to poor superconducting characteristics and have prompted the search for new methodologies.

SUMMARY OF THE INVENTION

In accordance with the present invention, the prior art limitations are effectively obviated by a novel processing sequence using solution chemistry rather than solid state chemistry. More specifically, the present invention involves preparing the desired high Tc oxides by a sol-gel process or by a precipitation followed by a freeze drying process, selection of a particular process being dictated by the nature of the final body, namely, a powder (precipitation-freeze dried) or a thin film (sol-gel).

BRIEF DESCRIPTION OF THE DRAWING

The invention will be more readily understood by reference to the accompanying drawing wherein:

The FIGURE is a graphical representation on coordinates of temperature in degrees Kelvin against resistivity normalized to the value at 90K for compositions prepared in accordance with the invention and by prior art ceramic processing techniques.

DESCRIPTION OF PREFERRED EMBODIMENTS

This process, initially, involves preparing a rare earth hydroxide by passing a rare earth (M) nitrate through a commercially available anionic resin which effects conversion of the nitrate to the corresponding hydroxide in accordance with the following Equation.

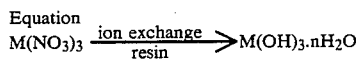

Following, an aqueous barium solution in acetic acid is reacted with copper acetate and the rare earth hydroxide and permitted to stand at room temperature. After several hours, a blue colloid is formed which is found to be stable for several weeks, stability being enhanced by ultrasound. The resultant colloid or gel may be used to form glassy-like or amorphous films on diverse substrates such as $Al_2O_3$, Si, $Z_rO_z$ or $SrTiO_3$ by conventional dipping, spraying or spinning techniques. The film is then dried at room temperature and, subsequently, heated slowly at a temperature within the range of 300–370° C. at a rate of 20° C. per hour. Then, it is heated slowly to 600° C. to remove organics. A final heating step at about 800° C. is then implemented to yield the desired superconducting composition with a Tc of 89–95K.

An example of the sol gel process is set forth below. It will be appreciated that the example is set forth solely for purposes of exposition and is not to be construed as limiting.

EXAMPLE 1

A barium solution was prepared by dissolving 0.2 mol/liter of $Ba(OH)_2.8H_2O$ in a 0.1 mol/liter solution of acetic acid. Then, 10 milliliters (0.3 mol/liter) of copper acetate and 10 milliliters of the barium solution were added to 10 milliliters of yttrium hydroxide ($YOH_3 nH_2O$). Initially, flocculation was observed with resolution thereof occurring in a few hours to yield a blue colloid. The colloid was stable for several hours with enhancement of stability being effected by ultra sound. The colloid (gel) was then permitted to dry at room temperature and then heated to a temperature within the range of 300–370° C. at a rate of 20° C. per hour, the slow heating rate being required to minimize shrinkage as organics are removed. Finally, the gel was placed in a hot oven and heated to a temperature of the order of 800° C. for 40 minutes to yield superconducting characteristics. Oxygenation of the superconducting composition at 540° C. was then effected to yield the correct stoichiometry for optimum superconductivity.

With reference now to the FIGURE, there is shown a graphical representation on coordinates of temperature in degrees Kelvin against resistivity, normalized to the value at 95K, for compositions prepared by known solid state reactions ($S_1$ and $S_2$) and by the controlled precipitation ($P_1$) and by the sol-gel process ($G_1$) in accordance with our invention. The width of superconducting transitions reflects the chemical inhomogeneities within the material which in turn relates to its microstructure. The FIGURE reveals that the sol-gel process permits the attainment of a sharper transition from a resistive state to a superconducting state. (90.2–88.8). This compares most favorably with the conventional ceramic processing for the carbonate (91.8 conventional 89.5) and for the nitrate (91.8–89.4), so indicating a more homogeneous material for the sol gel process at a lower reaction temperature.

The controlled precipitation process involves preparing a barium solution in acetic acid to which is added copper acetate and a rare earth nitrate. Then, the pH of the resultant solution is increased to a value at which the rare earth and copper hydroxides are formed (pH-6.8) by addition of a base to the solution. After a period of time, colloidal particles grow and form a viscous blue gel. Within a few hours after preparation, the colloid must be freeze dried to obtain a fine blue powder which is hygroscopic and amorphous.

The freeze dried powder is then slowly heated in air to a temperature of approximately 500° C. The use of a rapid heating rate results in expelling material from the heating crucible, such being attributed to a copious amount of gas being evolved in the processing. Heating is then continued to 600° C. at which point all organic compounds are removed, so yielding a crystalline phase which is resistive. Heating is then continued to within the range of 750° C. to 950° C. in oxygen and maintained thereat for 24 hours to yield superconducting single phase perovskite.

An example of the precipitation-freeze drying process is set forth below.

EXMAPLE 2

A 0.2 molar solution of barium was obtained by dissolving the required amount of $Ba(OH)_2 \cdot 8H_2O$ (98% purity) in a 0.1 molar solution of acetic acid. 10 milliliters of the resultant solution were then added, at room temperature to an equal volume of a 0.3 molar copper acetate (98% purity) yttrium nitrate (99.9% purity) mixture. Following, 3 milliliters of a 1 mol per liter ammonium hydroxide solution were rapidly added to the mixture to increase the pH to a value at which the hydroxides of yttrium and copper formed (6.8). After 30 minutes, colloidal particles began to grow and within a few hours a viscous blue gel formed. Shortly thereafter, the colloid was freeze dried for 24 hours to obtain a fine blue powder which was hygroscopic and amorphous. The freeze dried powder was then slowly heated to 500° C. to remove organics. At that juncture, x-ray diffraction studies revealed the presence of a mixture of crystalline phases which was resistive. Upon continued heating, these phases progressively disappeared and a superconducting perovskite was formed. The perovskite was then fired for 24 hours in air at a temperature within the range of 750° C. 950° C. and annealed for 24 hours in oxygen at 950° C. to yield the superconducting single phase perovskite.

With reference again to the FIGURE, it will be noted that the width of the superconducting transition (90.1–89.0) also indicates a sharp transition from a resistive state to a superconducting state and the presence of a homogeneous material. A ten minute freeze drying step also yields the same result. However the particle size is 2–4 microns as compared with a particle size of 0.5 for the 24 hour freeze dried sample.

The sol gel particle averages about 5 microns. Both of these results indicate the attainment of particle size substantially less than that obtained by standard ceramic techniques which range from 20–100 microns (fiber particle sizes enhancing reactivity which permits lowering

What is claimed is:

1. Method for the preparation of superconducting compositions of the formula $MBa_2Cu_3O_{7-y}$ wherein M represents yttrium and the rare earth elements and y is an integer ranging from 0.1 to 0.8 which comprises the steps of
    a. preparing a barium solution in acetic acid,
    b. adding the solution to a mixture of copper acetate and a rare earth nitrate,
    c. increasing the pH of the resultant solution to a value at which the rare earth and copper hydroxides are formed,
    d. forming a viscous gel solution,
    e. freeze drying the gel to yield a powder which is heated slowly to a temperature of approximately 600° C. to yield a crystalline resistive phase, and
    f. heating said resistive phase in oxygen at a temperature within the range of 750–950° C. to yield a superconducting single phase perovskite.

2. Method in accordance with claim 1 wherein said rare earth nitrate is yttrium nitrate.

3. Method in accordance with claim 1 wherein the pH of the solution is increased to a value of approximately 6.8.

4. Method in accordance with claim 1 wherein the freeze drying process is effected over a time period of 24 hours, so resulting in the formation of a hygroscopic, amorphous blue powder having a particle size of the order of 0.5 micron.

5. Method in accordance with claim 1 wherein said viscous gel is formed by permitting the solution to stand at room temperature.

* * * * *

UNITED STATES PATENT AND TRADEMARK OFFICE
CERTIFICATE OF CORRECTION

PATENT NO. : 4,962,082

DATED : October 9, 1990

INVENTOR(S) : P. Barboux, J-M Tarascon

It is certified that error appears in the above-identified patent and that said Letters Patent is hereby corrected as shown below:

On the title page item [54], and col. 1, line 1-5. Title, change "FIRMING" to "FIRING".

Column 3, line 28, change "EXMAPLE" to "EXAMPLE".

Column 4, Line 16, after "lowering" add "sintering temperatures which is economically desirable)."

Signed and Sealed this

Seventh Day of July, 1992

Attest:

DOUGLAS B. COMER

*Attesting Officer*   Acting Commissioner of Patents and Trademarks